(12) United States Patent
Ohsumi et al.

(10) Patent No.: US 9,446,758 B2
(45) Date of Patent: Sep. 20, 2016

(54) HYBRID VEHICLE AND METHOD FOR SETTING SPECIFICATIONS OF ENGINE AND MOTOR/GENERATOR IN HYBRID VEHICLE

(75) Inventors: Toshihiko Ohsumi, Higashi-Hiroshima (JP); Junji Kaneishi, Higashi-Hiroshima (JP); Yasuhiko Kato, Hiroshima (JP); Mitsugu Mera, Hatsukaichi (JP); Masahiko Fujimoto, Hiroshima (JP); Hitoshi Fukuba, Higashi-Hiroshima (JP); Kazuya Yokota, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 14/343,383

(22) PCT Filed: Aug. 31, 2012

(86) PCT No.: PCT/JP2012/005544
§ 371 (c)(1),
(2), (4) Date: Mar. 6, 2014

(87) PCT Pub. No.: WO2013/035294
PCT Pub. Date: Mar. 14, 2013

(65) Prior Publication Data
US 2014/0222275 A1    Aug. 7, 2014

(30) Foreign Application Priority Data
Sep. 8, 2011    (JP) .................................. 2011-196021

(51) Int. Cl.
*B60W 20/00*    (2016.01)
*B60K 6/24*    (2007.10)
(Continued)

(52) U.S. Cl.
CPC .............. *B60W 20/108* (2013.01); *B60K 6/24* (2013.01); *B60K 6/48* (2013.01); *B60L 11/14* (2013.01);
(Continued)

(58) Field of Classification Search
CPC ........... B60K 6/24; B60K 6/48; B60L 11/14; B60L 15/20; B60W 10/06; B60W 10/08; B60W 20/108; B60W 20/1082
USPC .......................................................... 701/22
See application file for complete search history.

(56) References Cited

U.S. PATENT DOCUMENTS 5,722,911 A    3/1998    Ibaraki et al.
5,806,617 A    9/1998    Yamaguchi
(Continued)

FOREIGN PATENT DOCUMENTS

CN    101546352 A    9/2009
CN    101574969 A    11/2009
(Continued)

OTHER PUBLICATIONS

Mo, Yanbin, HCCI Heat Release Rate and Combustion Efficiency: A Coupled Kiva Multi-Zone Modeling Study, 2008, http://deepblue.lib.umich.edu/bitstream/handle/2027.42/60734/yanbinm_1 .pdf?sequence=1, p. 1, 6-12, 28, 29, 72, 172.*
(Continued)

*Primary Examiner* — Aaron L Troost
(74) *Attorney, Agent, or Firm* — Studebaker & Brackett PC

(57) ABSTRACT

A hybrid vehicle (100) is a parallel hybrid vehicle including a motor/generator (5) arranged between an engine (1) and a transmission (62). The engine (1) is configured to perform lean operation in a low-load operating range. The hybrid vehicle is configured such that a rotation speed at a maximum point of power generation efficiency of the motor/generator (5) is within a rotation speed range (Xa) corresponding to a lower-speed part (a) of a 95% fuel-consumption efficiency operating range (A) of the engine (1).

7 Claims, 4 Drawing Sheets

(51) Int. Cl.
  *B60K 6/48* (2007.10)
  *B60L 11/14* (2006.01)
  *B60L 15/20* (2006.01)
  *B60W 10/06* (2006.01)
  *B60W 10/08* (2006.01)
  *B60K 6/26* (2007.10)
  *F02D 41/30* (2006.01)

(52) U.S. Cl.
  CPC ............... *B60L 15/20* (2013.01); *B60W 10/06* (2013.01); *B60W 10/08* (2013.01); *B60W 20/16* (2016.01); *B60K 6/26* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/445* (2013.01); *B60L 2250/26* (2013.01); *B60W 2510/085* (2013.01); *B60W 2710/0622* (2013.01); *F02D 41/3017* (2013.01); *Y02T 10/6221* (2013.01); *Y02T 10/6295* (2013.01); *Y02T 10/645* (2013.01); *Y02T 10/70* (2013.01); *Y02T 10/7077* (2013.01); *Y02T 10/72* (2013.01); *Y02T 10/7275* (2013.01); *Y10S 903/93* (2013.01)

(56) References Cited

U.S. PATENT DOCUMENTS

| | | | |
|---|---|---|---|
| 5,942,879 A * | 8/1999 | Ibaraki | B60K 6/48 180/65.25 |
| 2007/0233332 A1* | 10/2007 | Kawada | B60K 6/365 701/13 |
| 2011/0067679 A1* | 3/2011 | Hitomi | F02D 41/3035 123/564 |

FOREIGN PATENT DOCUMENTS

| | | | |
|---|---|---|---|
| CN | 101858267 A | | 10/2010 |
| JP | 08-294205 A | | 11/1996 |
| JP | 09-037410 A | | 2/1997 |
| JP | 2004-027849 A | | 1/2004 |
| JP | 2007-269257 A | | 10/2007 |
| JP | 2007-292060 A | | 11/2007 |
| JP | 2010-236429 | * | 10/2010 |
| JP | 2010-236429 A | | 10/2010 |

OTHER PUBLICATIONS

International Search Report; PCT/JP2012/005544; Oct. 6, 2012.

* cited by examiner

HYBRID VEHICLE AND METHOD FOR SETTING SPECIFICATIONS OF ENGINE AND MOTOR/GENERATOR IN HYBRID VEHICLE

TECHNICAL FIELD

The present invention relates to parallel hybrid vehicles including a motor/generator provided between an engine and a transmission and to methods for setting specifications of the engine and the motor/generator in the hybrid vehicle.

BACKGROUND ART

Hybrid vehicles including an engine and a motor/generator have been known. An example of such hybrid vehicles includes a parallel hybrid vehicle (e.g., Patent Document 1). Wheels of the parallel hybrid vehicle are driven only by the motor/generator in, for example, an operating range in which the load is relatively low, whereas the wheels are driven only by the engine or by the engine and the motor/generator in an operating range in which the load is relatively medium and in an operating range in which the load is relatively high. When the speed of the parallel hybrid vehicle is reduced, the vehicle performs regenerative operation by the motor/generator to charge a battery. Even when the wheels of the parallel hybrid vehicle are driven only by the engine, there may be a case where the engine is operated in an operating range in which the load is higher than or equal to a torque required by the vehicle and results in high fuel-consumption efficiency, while the motor/generator is operated by a surplus torque exceeding the torque required by the vehicle, thereby generating power.

CITATION LIST

Patent Document

PATENT DOCUMENT 1: Japanese Unexamined Patent Publication No. 2004-27849

SUMMARY OF THE INVENTION

Technical Problem

As described above, the efficiency of the engine varies depending on the operating range of the engine, and it is of course preferable to operate the engine in a high-efficiency operating range. However, the hybrid vehicle also includes a motor/generator, and the motor/generator has an operating range in which the motor/generator can provide high efficiency. That is, in the case of the hybrid vehicle, seeking for the efficiency of only the engine cannot improve the efficiency of the entire system, and thus elements other than the engine have to be taken into consideration.

The technique disclosed here was devised in view of the above-discussed problems. It is an objective of the technique to improve the efficiency of the entire system of the hybrid vehicle.

Solution to the Problem

The technique disclosed here is directed to a method for setting specifications of an engine and a motor/generator of a parallel hybrid vehicle in which the motor/generator is provided between the engine and a transmission. The engine is configured to perform lean operation in a low-load operating range and when an output of the engine is increased in a state in which the engine is operated in a lower-speed part of an operating range in which a ratio of fuel-consumption efficiency of the engine to maximum fuel-consumption efficiency is higher than or equal to a predetermined ratio, the operation state is controlled in the lower-speed part. The method includes: setting the specifications of the engine and the motor/generator such that a rotation speed at a maximum point of power generation efficiency of the motor/generator is within a rotation speed range corresponding to the lower-speed part of the operating range in which the ratio of fuel-consumption efficiency of the engine to maximum fuel-consumption efficiency is higher than or equal to the predetermined ratio.

When the operating range of the engine is divided into two ranges, a low load range and a high load range, the term "low load" in the specification may corresponds to the low load range.

In the above-described configuration, the hybrid vehicle is a parallel hybrid vehicle in which a motor/generator is provided between an engine and a transmission. Therefore, there is a case where both the engine and the motor/generator are operated at the same time. For example, when the engine is operated with a load higher than or equal to a torque required by the vehicle, and a surplus torque is used to operate the motor/generator, electric power is generated while the drive wheels are driven. In this case, since the motor/generator is arranged between the engine and the transmission, the motor/generator rotates at the same rotation speed as the engine. Therefore, when the rotation speed at the maximum point of power generation efficiency of the motor/generator is set within the rotation speed range corresponding to the operating range in which the fuel-consumption efficiency of the engine is high, it is possible to operate the engine in the operating range in which the fuel-consumption efficiency is high, and at the same time, it is possible to operate the motor/generator at the rotation speed at which the power generation efficiency is high. Here, according to the configuration described above, since the engine performs the lean operation in the low-load operating range, the fuel-consumption efficiency in the low-load operating range has been improved. As a result, the operating range in which the fuel-consumption efficiency of the engine is high is extended to a lower load, and further to a lower speed. As the operating range in which the fuel-consumption efficiency of the engine is high extends in the direction of the rotation speed, the degree of freedom increases when the rotation speed at the maximum point of power generation efficiency of the motor/generator is set within the rotation speed range corresponding to the operating range in which the fuel-consumption efficiency of the engine is high. In such a situation, in the configuration described above, the rotation speed of at the maximum point of power generation efficiency of the motor/generator is set within the rotation speed range corresponding to the lower-speed part of the operating range in which the ratio of the fuel-consumption efficiency of the engine to the maximum fuel-consumption efficiency is higher than or equal to a predetermined ratio. With this configuration, when the engine and the motor/generator are operated at a rotation speed in which both the fuel-consumption efficiency of the engine and the power generation efficiency of the motor/generator are high, the resistance of the transmission can also be reduced. That is, the resistance of the transmission increases as the rotation speed increases. Thus, the lower-speed part of the operating range in which the ratio of the fuel-consumption efficiency of the engine to the maximum fuel-consumption efficiency is higher than or equal to the predetermined ratio can be a portion of the operating range in which the resistance of the transmission is small. When the rotation speed of the motor/generator at the maximum power generation efficiency is set within the rotation speed range corresponding to the lower-speed part, operating the engine and the motor/generator at a rotation speed at which both the fuel-consumption efficiency of the engine and the power generation efficiency of the motor/generator are high can necessarily reduce the resistance of the transmission. Moreover, even when power required by the vehicle increases, the operation state of the engine is controlled in the lower-speed part of an operating range in which the ratio of the fuel-consumption efficiency to the maximum fuel-consumption efficiency is higher than or equal to the predetermined ratio. Therefore, a state in which the fuel-consumption efficiency of the engine is high, the power generation efficiency of the motor/generator is high, and the resistance of the transmission is low can be maintained as much as possible.

Moreover, a technique disclosed herein is directed to a parallel hybrid vehicle including: an engine; a transmission; and a motor/generator provided between the engine and the transmission. A rotation speed at a maximum point of power generation efficiency of the motor/generator is within a rotation speed range corresponding to a lower-speed part of an operating range in which a ratio of fuel-consumption efficiency of the engine to maximum fuel-consumption efficiency is higher than or equal to a predetermined ratio, and the engine is configured to perform lean operation in a low-load operating range, and when an output of the engine is increased in a state in which the engine is operated in the lower-speed part of the operating range in which the ratio of fuel-consumption efficiency of the engine to maximum fuel-consumption efficiency is higher than or equal to the predetermined ratio, the operation state is controlled in the lower-speed part.

In the above-described configuration, the hybrid vehicle is a parallel hybrid vehicle in which a motor/generator is provided between an engine and a transmission. Therefore, there is a case where both the engine and the motor/generator are operated at the same time. For example, when the engine is operated with a load higher than or equal to a torque required by the vehicle, and a surplus torque is used to operate the motor/generator, electric power is generated while the drive wheels are driven. In this case, since the motor/generator is arranged between the engine and the transmission, the motor/generator rotates at the same rotation speed as the engine. Therefore, when the rotation speed at the maximum point of power generation efficiency of the motor/generator is set within the rotation speed range corresponding to the operating range in which the fuel-consumption efficiency of the engine is high, it is possible to operate the engine in the operating range in which the fuel-consumption efficiency is high, and at the same time, it is possible to operate the motor/generator at the rotation speed at which the power generation efficiency is high. Here, according to the configuration described above, since the engine performs the lean operation in the low-load operating range, the fuel-consumption efficiency in the low-load operating range has been improved. As a result, the operating range in which the fuel-consumption efficiency of the engine is high is extended to a lower load, and further to a lower speed. As the operating range in which the fuel-consumption efficiency of the engine is high extends in the direction of the rotation speed, the degree of freedom increases when the rotation speed at the maximum point of power generation efficiency of the motor/generator is set within the rotation speed range corresponding to the operating range in which the fuel-consumption efficiency of the engine is high. In such a situation, in the configuration described above, the rotation speed at the maximum point of power generation efficiency of the motor/generator is set within the rotation speed range corresponding to the lower-speed part of the operating range in which the ratio of the fuel-consumption efficiency of the engine to the maximum fuel-consumption efficiency is higher than or equal to a predetermined ratio. With this configuration, when the engine and the motor/generator are operated at a rotation speed in which both the fuel-consumption efficiency of the engine and the power generation efficiency of the motor/generator are high, the resistance of the transmission can also be reduced. Moreover, even when power required by the vehicle increases, the operation state of the engine is controlled in the lower-speed part of an operating range in which the ratio of the fuel-consumption efficiency to the maximum fuel-consumption efficiency is higher than or equal to the predetermined ratio. Therefore, a state in which the fuel-consumption efficiency of the engine is high, the power generation efficiency of the motor/generator is high, and the resistance of the transmission is low can be maintained as much as possible.

The predetermined ratio may be 95%.

With this configuration, as described above, when the engine and the motor/generator are operated at a rotation speed in which both the fuel-consumption efficiency of the engine and the power generation efficiency of the motor/generator are high, the ratio of the fuel-consumption efficiency of the engine to the maximum fuel-consumption efficiency can be 95% or higher.

A geometrical compression ratio of the engine may be greater than or equal to 13, and in the lean operation, the engine may have an excess air ratio greater than or equal to 2, or a G/F greater than or equal to 30, and allow combustion by compression self-ignition.

In an engine having such a configuration, the operating range in which the fuel-consumption efficiency of the engine is high can be extended to an operating range in which the load is low and the rotation speed is low. As a result, the operating range in which the fuel-consumption efficiency of the engine is high and the maximum point of power generation efficiency of the motor/generator can be matched to each other at a rotation speed as low as possible. Thus, it is possible to further reduce the resistance of the transmission.

A geometrical compression ratio of the engine may be greater than or equal to 13, and a ratio of an effective expansion ratio to an effective compression ratio of the engine may be higher in a lower-load operating range than in a higher-load operating range.

Similarly, in an engine having such a configuration, the operating range in which the fuel-consumption efficiency of the engine is high can be extended to an operating range in which the load is low and the rotation speed is low. As a result, the operating range in which the fuel-consumption efficiency of the engine is high and the maximum point of power generation efficiency of the motor/generator can be matched to each other at a rotation speed as low as possible. Thus, it is possible to further reduce the resistance of the transmission.

Advantages of the Invention

According to the present invention, the engine can be operated in a state in which all of the fuel-consumption efficiency of the engine, the power generation efficiency of the motor/generator, and the efficiency of the transmission are high, so that the efficiency of the entire system of the hybrid vehicle can be improved.

BRIEF DESCRIPTION OF THE DRAWINGS

FIG. 3(A) is a fuel-consumption efficiency characteristic map of the engine, and FIG. 3(B) is a power generation efficiency map of the motor/generator.

DESCRIPTION OF EMBODIMENTS

Figure 1:
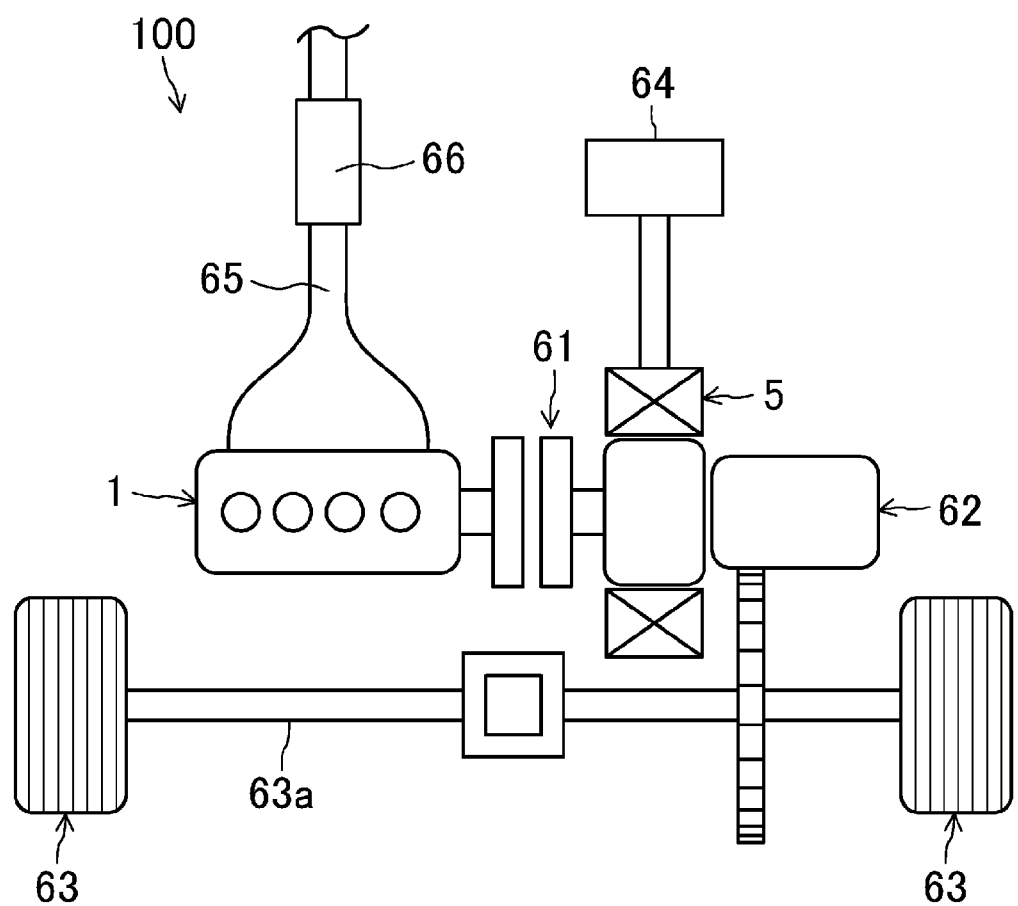
FIG. 1 is a view schematically illustrating a power transmission system of a hybrid vehicle.

Example embodiments will be described in detail below with reference to the drawings. FIG. 1 schematically illustrates a configuration of a power transmission system of a hybrid vehicle.

A hybrid vehicle 100 includes a gasoline engine (hereinafter simply referred to as "engine") 1, a clutch 61, a motor/generator 5, a transmission 62, drive wheels 63, 63, and a battery 64, and is a so-called parallel hybrid vehicle. The engine 1 is a spark ignition type internal combustion engine as described in detail later, and is a so-called lean burn engine configured to lean a fuel-air mixture at least in a partial-load operating range. The clutch 61 is configured to switch connection and disconnection of the engine 1 to the motor/generator 5. The motor/generator 5 drives the drive wheels 63, 63 while charging the battery 64 by performing regenerative operation in deceleration. The transmission 62 is an automatic transmission having a torque converter. The transmission 62 is connected to a wheel driving shaft 63a of the drive wheels 63, 63 via a gear so that power can be transmitted. The transmission 62 transmits driving power of the engine 1 and the motor/generator 5 to the drive wheels 63, 63.

In the hybrid vehicle 100, the engine 1, the motor/generator 5, and the transmission 62 are connected in series in this order. Here, the clutch 61 is interposed between the engine 1 and the motor/generator 5. Bringing the clutch 61 into an engaged state connects the engine 1 to the motor/generator 5. In this case, the hybrid vehicle 100 runs using only the power of the engine 1, or runs using the power of the motor/generator 5 additionally to the power of the engine 1. When the hybrid vehicle 100 runs using only the power of the engine 1, there is also a case where part of the power of the engine 1 is used to operate the motor/generator 5 to charge the battery while the vehicle is running. On the other hand, when the clutch 61 is released, the engine 1 is disconnected from the motor/generator 5. This is the state when the hybrid vehicle 100 runs using only the power of the motor/generator 5.

Figure 2:
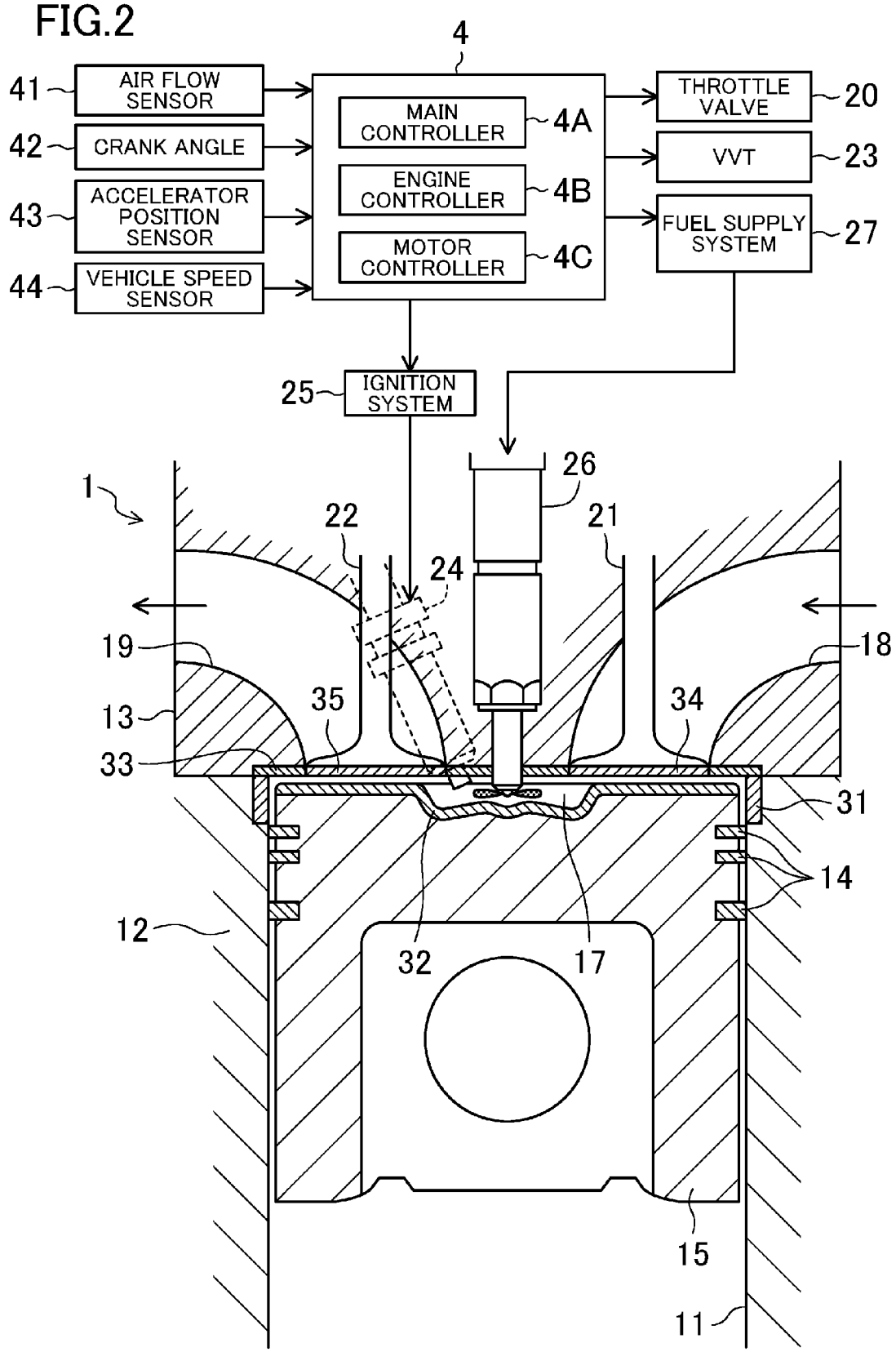
FIG. 2 is a view schematically illustrating a configuration of an engine system.

An engine system of the hybrid vehicle 100 will be described in detail below. FIG. 2 is a view schematically illustrating a configuration of the engine system. The engine system includes the engine (engine body) 1, various actuators associated with the engine 1, various sensors, and a controller 4 configured to control the actuators based on signals from the sensors. The engine 1 includes a cylinder block 12 and a cylinder head 13 placed on the cylinder block 12. In the cylinder block 12, a plurality of cylinders 11 (only one of which is illustrated in FIG. 2) are formed. In the cylinder block 12 and the cylinder head 13, a water jacket (not shown) through which cooling water flows is formed.

A piston 15 is slidably inserted into each cylinder 11 and defines a combustion chamber 17 together with the cylinder 11 and the cylinder head 13. In this embodiment, a recessed portion is formed in a crown surface of the piston 15. For each cylinder 11, two intake ports 18 one of which is illustrated in FIG. 2 are formed in the cylinder head 13. Each intake port 18 is open in a lower surface of the cylinder head 13 (a ceiling surface of the cylinder head 13 defining an upper surface of the combustion chamber 17) so as to communicate with the combustion chamber 17. Similarly, for each cylinder 11, two exhaustion ports 19 are formed in the cylinder head 13. Each exhaustion port 19 is open in the ceiling surface of the cylinder head 13 so as to communicate with the combustion chamber 17. The intake port 18 is connected to an intake passage (not shown) through which new air is introduced into the cylinder 11. In the intake passage, a throttle valve 20 configured to adjust the intake air flow rate is installed. The throttle valve 20 receives a control signal from the controller to adjust the position of the throttle valve 20. On the other hand, the exhaustion port 19 is connected to an exhaustion passage 65 (see FIG. 1) through which a burned gas (exhaust gas) from each cylinder 11 flows. In the exhaustion passage 65, as illustrated in FIG. 1, an exhaust gas purifier 66 having one or more catalyst converters is disposed.

As illustrated in the figure, an inlet valve 21 and an exhaustion valve 22 are respectively disposed to shut off (close) the intake port 18 and the exhaustion port 19 from the combustion chamber 17. The inlet valve 21 is driven by an inlet valve drive mechanism. The exhaustion valve 22 is driven by an exhaustion valve drive mechanism. The inlet valve 21 and the exhaustion valve 22 reciprocate at a predetermined timing to open and close the intake port 18 and the exhaustion port 19, respectively to exchange the gas in the cylinder 11. The inlet valve drive mechanism and the exhaustion valve drive mechanism respectively have an inlet camshaft and an exhaustion camshaft (not shown) which are driving-connected to a crank shaft. These camshafts rotate in synchronous with the rotation of the crank shaft. Moreover, at least the inlet valve drive mechanism of both the drive mechanisms includes a hydraulic or mechanical variable valve timing (VVT) mechanism 23 capable of continuously varying the phase of the inlet camshaft within a predetermined angle range. A continuous variable valve lift (CVVL) mechanism capable of continuously varying the degree of valve lift may be provided together with the VVT mechanism 23.

An ignition plug 24 is attached to the cylinder head 13 by a known structure, such as a screw. In this embodiment, the ignition plug 24 is tilted to an exhaust side relative to the center axis of the cylinder 11 and has a tip (electrode) facing a ceiling portion of the combustion chamber 17. Note that the position of the ignition plug 24 is not limited to this embodiment. An ignition system 25 receives a control signal from the controller 4 and supplies electric power to the ignition plug 24 to produce a spark at a desirable ignition timing. As an example, the ignition system 25 may include a plasma generation circuit, and the ignition plug 24 may be a plasma generation circuit.

The fuel injection valve 26 is arranged along the center axis of the cylinder 11 in this embodiment, and is attached to the cylinder head 13 by a known structure such as a bracket. A tip of the fuel injection valve 26 faces the center of the ceiling portion of the combustion chamber 17. Note that the position of the fuel injection valve 26 is not limited to this embodiment. The fuel injection valve 26 may be but not limited to a fuel injection valve having multiple injection holes.

A fuel supply system 27 includes a fuel supply system for supplying fuel to the fuel injection valve 26 and an electric circuit for driving the fuel injection valve 26. The electric circuit receives a control signal from the controller 4 to operate the fuel injection valve 26 so that a desirable amount of fuel is injected into the combustion chamber 17 at a predetermined timing. Here, fuel for the engine 1 is gasoline in this embodiment. However, various types of liquefaction fuel including light oil and bioethanol, and various types of gaseous fuel including natural gas can be accordingly used.

The controller 4 includes a main controller 4A, an engine controller 4B configured to control the engine 1, and a motor controller 4C configured to control the motor/generator 5. The controller 4 is a controller using a known microcomputer as a base, and includes a central processing unit (CPU) for executing a program, a memory including RAM, ROM, or the like and storing the program and data, and an input/output (I/O) bus via which an electrical signal is input/output. Note that the main controller 4A, the engine controller 4B, and the motor controller 4C may be configured as controllers separated from one another, or may be configured as one controller.

The controller 4 receives at least a signal relating to the intake air flow rate from an air flow sensor 41, a crank angle pulse signal from a crank angle sensor 42, an accelerator position signal from an accelerator position sensor 43 for detecting the amount by which an accelerator pedal is depressed, and a vehicle speed signal from a vehicle speed sensor 44. The controller 4, in particular, the main controller 4A computes power required by the vehicle based on these input signals, and based on the required power, the controller 4 determines contents of control for the engine 1 and the motor/generator 5. For example, based on the required power, the main controller 4A determines whether the engine 1 is to be operated or the motor/generator 5 is to be operated. When the motor/generator 5 is to be operated, the main controller 4A determines whether the motor/generator 5 is operated as a generator or as a motor. Moreover, the main controller 4A determines target output power of the engine 1 and/or the motor/generator 5. According to the order from the main controller 4A, the engine controller 4B and the motor controller 4C control the engine 1 and the motor/generator 5, respectively. Based on the target output power, the engine controller 4B computes parameters such as a desired throttle opening position signal, a fuel injection pulse, an ignition signal, and a valve phase angle signal. The engine controller 4B outputs these signals to the throttle valve 20 (a throttle actuator which moves the throttle valve 20), the fuel supply system 27, the ignition system 25, the VVT mechanism 23, etc. Based on the order from the main controller 4A, the motor controller 4C allows the motor/generator 5 to function as a generator or allows the motor/generator 5 to function as a motor. When the motor/generator 5 is allowed to function as a motor, the motor controller 4C controls, based on the target output power, the electric power supplied from the battery 64 to the motor/generator 5. The contents of control for the engine 1 and the motor/generator 5 will be described in detail later.

Here, the engine 1 of the present embodiment is set to have a high compression ratio in which the geometrical compression ratio $\epsilon$ is greater than or equal to 13 and less than or equal to 40. Moreover, at least in a partial-load operating range (in other words, in a low-load to medium-load operating range), the engine 1 has an operating range in which the engine 1 performs lean operation. In this operating range, the excess air ratio $\lambda$ is set to 2 or greater (preferably 2.5 or greater) and 8 or less, or the G/F (the gas fuel ratio representing the ratio of the amount of fuel to the amount of EGR gas and new air) is set to 30 or greater and 120 or less, thereby leaning the fuel-air mixture.

Moreover, in the low-load to medium-load operating range of the engine 1, the closing timing of the inlet valve is set so as to be later than the bottom dead center by a predetermined amount so that the effective expansion ratio is higher than the effective compression ratio of the engine 1. Note that the closing timing of the inlet valve may be set so as to be earlier than the bottom dead center so that the effective expansion ratio is higher than the effective compression ratio of the engine 1. On the other hand, in a high-load operating range of the engine 1, the inlet valve is not controlled in such a way, and thus the effective compression ratio is substantially equal to the effective expansion ratio. That is, in the engine 1, the ratio of the effective expansion ratio to the effective compression ratio is higher in the low-load to medium-load operating range than in the high-load operating range. Note that in the low-load to medium-load operating range of the engine 1, the ratio of the effective expansion ratio to the effective compression ratio may be varied, depending on the load, such that the ratio of the effective expansion ratio to the effective compression ratio increases as the load reduces.

Moreover, in the engine 1, in the case where the excess air ratio $\lambda=1$ in the high-load operating range including the full load when the engine 1 is warm, a spark ignition mode in which the ignition plug 24 is driven to ignite the fuel-air mixture in the combustion chamber 17 is used. In the other operating range (in other words, in the medium-load to low-load operating range) in which the excess air ratio $\lambda$ is set to 2-8 (or the G/F is set to 30-120), a compression ignition mode in which the fuel-air mixture in the combustion chamber 17 is ignited by compression is used. The compression ignition mode may be used in the entire operating range of the engine 1. Even in the compression ignition mode, compression self-ignition may be promoted by ignition before the compression top dead center and near the compression top dead center (ignition assist) in an operating range in which the compression self-ignition is difficultly caused.

Additionally, the engine 1 includes a heat insulated structure provided in the combustion chamber 17. That is, in the engine 1, heat insulation of the combustion chamber 17 is combined with the high compression ratio and the leaning. In this way, in the engine 1, the indicated thermal efficiency of an engine is increased, thereby significantly improving fuel consumption performance compared to conventional fuel consumption performance.

Specifically, as described above, the geometrical compression ratio $\epsilon$ in the engine 1 is set to 13 or greater and 40 or less. The theoretical thermal efficiency $\eta_{th}$ in the Otto cycle which is a theoretical cycle is given by the expression: $\eta_{th}=1-1/(\epsilon^{\kappa-1})$. The higher the compression ratio $\epsilon$, the higher the theoretical thermal efficiency $\eta_{th}$ is. Moreover, the higher the ratio of the specific heat $\kappa$ of a gas, in other words, the higher the excess air ratio $\lambda$, the higher the theoretical thermal efficiency $\eta_{th}$ is.

However, the indicated thermal efficiency of an engine (correctly, an engine provided with no heat insulated structure of a combustion chamber) reaches a peak at a predetermined geometrical compression ratio $\epsilon$ (e.g., about 15). Further increasing the geometrical compression ratio $\epsilon$ does not increase the indicated thermal efficiency but, in contrast, reduces the indicated thermal efficiency. This is because when the geometrical compression ratio is increased with the amount of fuel and the amount of intake air being maintained, the higher the compression ratio, the higher the combustion pressure and the combustion temperature increase. That is, cooling loss due to dissipation of heat via surfaces defining the combustion chamber 17 is determined by the expression: cooling loss=heat transfer rate×heat transmission area×(gas temperature−temperature of the defining surface), and the higher the pressure and the temperature of a combustion gas, the higher the heat transfer rate is. Therefore, increasing the combustion pressure and the combustion temperature means increasing the cooling loss. As a result, the higher the geometrical compression ratio, the lower the indicated thermal efficiency of the engine is. As described above, when the geometrical compression ratio is increased to increase the indicated thermal efficiency of the engine while leaning the fuel-air mixture, the cooling loss increases, so that the indicated thermal efficiency does not further increase after the indicated thermal efficiency reached a value significantly lower than the theoretical thermal efficiency.

In contrast, the heat insulated structure of the combustion chamber 17 is also used in the engine 1 so that the indicated thermal efficiency increases at a high geometrical compression ratio $\epsilon$. That is, the heat insulation of the combustion chamber 17 reduces the cooling loss, thereby increasing the indicated thermal efficiency.

On the other hand, simply reducing the cooling loss by the heat insulation of the combustion chamber 17 does not much contribute to improvement of the indicated thermal efficiency because the reduction in cooling loss is converted to the exhaust loss. However, in the engine 1, as described above, the expansion ratio is increased by increasing the compression ratio, thereby efficiently converting the energy of the combustion gas corresponding to the reduction in cooling loss to mechanical work. That is, the engine 1 adopts a configuration in which both the cooling loss and the exhaust loss are reduced, thereby significantly improving the indicated thermal efficiency.

Here, the excess air ratio $\lambda$ is considered. When the excess air ratio $\lambda$ becomes less than 2, the maximum combustion temperature in the combustion chamber 17 increases, so that RawNOx can be released from the combustion chamber 17. As described above, in the engine 1, the exhaust loss is also reduced in addition to the cooling loss. Therefore, the engine 1 has a relatively low exhaust temperature, and is disadvantageous for activation of a catalyst. Therefore, it is preferable to avoid or reduce the release of RawNOx from the combustion chamber 17. In order to avoid or reduce the release, the excess air ratio $\lambda$ is preferably set to 2 or greater. In other words, the excess air ratio $\lambda$ is preferably set within the range in which the maximum combustion temperature in the combustion chamber 17 is lower than or equal to a predetermined temperature, for example, 1800 K (Kelvin) as a temperature at which RawNOx can be generated. When, for example, in the partial-load operating range of the engine 1, the maximum combustion temperature exceeds the predetermined temperature as the load increases (in other words, as the excess air ratio $\lambda$ increases due to an increase in fuel injection quantity), the engine controller 4B preferably operates the engine 1 with the excess air ratio $\lambda$ being reduced.

On the other hand, according to studies by the inventors of the present application, the indicated thermal efficiency reaches a peak when the excess air ratio $\lambda$ is 8. Therefore, the range of the excess air ratio $\lambda$ is preferably greater than or equal to 2 and less than or equal to 8. Note that in the high-load operating range including the full load of the engine 1, the excess air ratio $\lambda$ may be further reduced, for example, such that $\lambda=1$ or $\lambda\geq1$ by assigning priority to the torque. The value range of the excess air ratio $\lambda$ is a preferable range in the medium-load and low-load operating ranges of the engine 1.

Leaning the fuel-air mixture means opening the throttle valve 20, and thus the leaning can contribute to improvement of the indicated thermal efficiency by reducing gas exchange loss (pumping loss).

The heat insulated structure of the combustion chamber 17 will be described in detail below. As also illustrated in FIG. 2, the combustion chamber 17 is defined by a wall surface of the cylinder 11, the crown surface of the piston 15, the lower surface (the ceiling surface) of the cylinder head 13, and surfaces of valve heads of the inlet valve 21 and the exhaustion valve 22. These surfaces are provided with heat-insulating barriers 31, 32, 33, 34, and 35 having a configuration described later, thereby providing a heat insulating property to the combustion chamber 17. These heat-insulating barriers 31-35 may also be hereinafter collectively denoted by adding reference number "3" to the term "heat-insulating barrier." The heat-insulating barrier 3 may be provided on all or some of the defining surfaces. Moreover, in the illustrated example, the heat-insulating barrier 31 on the cylinder wall surface is provided at a position above piston rings 14 with the piston 15 being located at the top dead center, which results in a configuration in which the piston rings 14 do not slide on the heat-insulating barrier 31. Note that the heat-insulating barrier 31 on the cylinder wall surface is not limited to this configuration. The heat-insulating barrier 31 may be extended downward so as to be provided over the full stroke of the piston 15 or part of the stroke of the piston 15. A heat-insulating barrier may be provided on port wall surfaces of the intake port 18 and the exhaustion port 19 near the openings facing the ceiling surface of the combustion chamber 17 although the port wall surfaces are not wall surfaces defining the combustion chamber 17. Note that the thickness of each of the heat-insulating barriers 31-35 illustrated in FIG. 2 shows a mere example but does not correspond to the actual thickness, and does not indicate the relationship in thickness among the heat-insulating barriers on the surfaces.

Since the heat-insulating barriers 31-35 reduce dissipation of heat of the combustion gas in the combustion chamber via the defining surfaces, the thermal conductivity of the heat-insulating barriers 31-35 is set to be lower than the thermal conductivity of a base material made of metal forming the combustion chamber 17. Here, the cylinder block 12 serves as the base material for the heat-insulating barrier 31 provided on the wall surface of the cylinder 11. The piston 15 serves as the base material for the heat-insulating barrier 32 provided on the crown surface of the piston 15. The cylinder head 13 serves as the base material for the heat-insulating barrier 33 provided on the ceiling surface of the cylinder head 13. The inlet valve 21 and the exhaustion valve 22 serve as the base materials for the heat-insulating barriers 34 and 35 respectively provided on the valve head surfaces of the inlet valve 21 and the exhaustion valve 22. Thus, the kind of the base materials for the cylinder block 12, the cylinder head 13, and the piston 15 is an aluminum alloy or a gray cast iron, and the kind of the base materials for the inlet valve 21 and the exhaustion valve 22 is a heat resisting steel or a gray cast iron. However, as described above, since the exhaust loss in the engine 1 is reduced, the exhaust gas temperature is significantly lowered. Therefore, the heat resisting steel is not necessarily used for, in particular, the exhaustion valve 22. For the exhaustion valve 22, it is possible to use a material (e.g., an aluminum alloy), which cannot be used or is difficultly used in conventional configurations.

Moreover, the volumetric specific heat of the heat-insulating barrier 3 is preferably lower than that of the base material in order to reduce the cooling loss. That is, the gas temperature in the combustion chamber 17 varies as the combustion cycle advances. However, in the conventional engine provided with no heat insulated structure of the combustion chamber, cooling water flows in the water jacket formed in the cylinder head and the cylinder block, so that the surfaces defining the combustion chamber 17 maintain a substantially constant temperature regardless of the advance of the combustion cycle. On the other hand, the cooling loss is determined based on the following expression: cooling loss=heat transfer rate×heat transmission area×(gas temperature−temperature of defining surfaces). Therefore, the greater the difference between the gas temperature and the temperature of the wall surface, the larger the cooling loss is. In order to reduce the cooling loss, it is preferable to reduce the difference between the gas temperature and the temperature of the cooling surfaces. However, as described above, when the surfaces defining the combustion chamber 17 are maintained at a substantially constant temperature, it is inevitable that the temperature difference becomes large when the gas temperature varies. Thus, it is preferable to reduce the heat capacity of the heat-insulating barrier 3 so that the temperature of the surfaces defining the combustion chamber 17 varies to follow the variation in gas temperature in the combustion chamber 17.

Reducing the heat capacity of the heat-insulating barrier 3 is also advantageous in reducing the exhaust loss. That is, if the heat capacity of the heat-insulating barrier is large, the temperature of the defining surfaces does not lower even when the temperature in the combustion chamber 17 lowers, but the temperature in the combustion chamber 17 is maintained at a high value since the combustion chamber 17 has the heat insulated structure. This results in increasing the exhaust loss, which inhibits the improvement in the thermal efficiency of the engine 1. In contrast, in the case where the heat capacity of the heat-insulating barrier 3 is reduced, then when the temperature of the combustion chamber 17 lowers, the temperature of the defining surfaces lowers so as to follow the temperature of the combustion chamber 17. Thus, it is possible to avoid that the temperature in the combustion chamber 17 is maintained at a high value. Therefore, reducing the heat capacity of the heat-insulating barrier 3 can also be advantageous in reducing the exhaust loss in addition to the reducing the cooling loss by the temperature followability described above.

The heat-insulating barrier 3 may be a film made of zirconia ($ZrO_2$) or partially stabilized zirconia (PSZ) formed on the wall surface of the cylinder 11, the crown surface of the piston 15, the ceiling surface of the cylinder head 13, and the valve head surfaces of the inlet valve 21 and the exhaustion valve 22, that is, the defining surfaces defining the combustion chamber 17 by, for example, plasma splaying. Since zirconia or partially stabilized zirconia has a relatively low thermal conductivity and a relatively low volumetric specific heat, the heat-insulating barrier 3 having a thermal conductivity lower than the base material and a volumetric specific heat lower than or equal to the volumetric specific heat of the base material is formed.

Figure 3A:
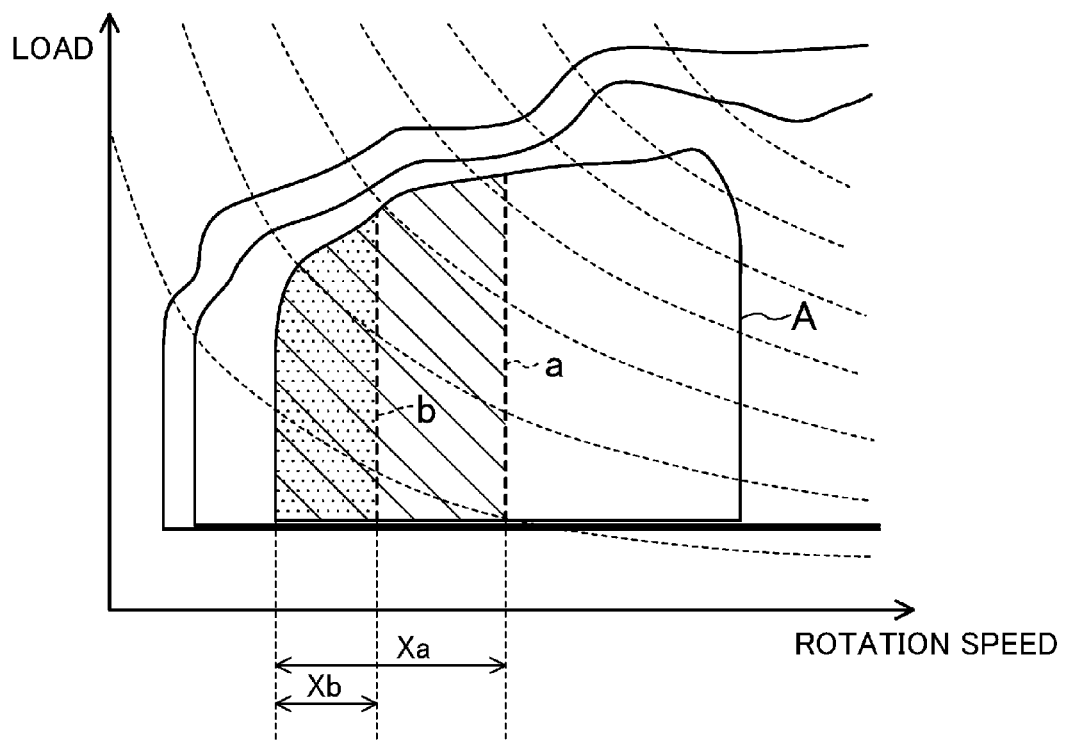
FIGS. 3(A) and 3(B) are views illustrating efficiency characteristics of the engine and the motor/generator, where

Next, the fuel-consumption efficiency of the engine 1 having such a configuration will be described. FIG. 3(A) illustrates a fuel-consumption efficiency characteristic map of the engine 1. The solid line in FIG. 3(A) is an equal fuel efficiency curve which connects points of equal fuel-consumption efficiency and indicates a borderline between regions. The broken line is an equal power curve which connects points of equal power (horsepower) and indicates a borderline between regions. The fuel-consumption efficiency characteristic map shows the fuel-consumption efficiency characteristic of a single engine. The fuel-consumption efficiency of the single engine can be obtained by, for example, evaluating the single engine by using a bench tester.

The fuel-consumption efficiency of the engine 1 is low when the rotation speed is too slow or too fast, and the load is too small or too large. Specifically, an operating range in which the fuel-consumption efficiency of the engine 1 is maximum is located near the center of the map. From near the center of the map, the fuel-consumption efficiency decreases as the rotation speed is reduced or increased or the load is reduced or increased. A range A in FIG. 3(A) is an operating range in which the ratio of the fuel-consumption efficiency to the maximum fuel-consumption efficiency is 95% (hereinafter simply referred to as a "95% fuel-consumption efficiency operating range"). As described above, the fuel consumption performance of the engine 1 is significantly improved, and an operating range in which the fuel-consumption efficiency is high is extended. Specifically, the 95% fuel-consumption efficiency operating range A is extended both in the direction of the rotation speed and in the direction of the load. As an example, the minimum rotation speed of the engine 1 of the present embodiment in the 95% fuel-consumption efficiency operating range A is less than ⅓ of the rated rotation speed, and specifically about 1000 rpm. On the other hand, the maximum rotation speed in the 95% fuel-consumption efficiency operating range A is about 3000 rpm. Moreover, the minimum load of the engine 1 in the 95% fuel-consumption efficiency operating range A extends below half the full engine load.

Figure 3B:
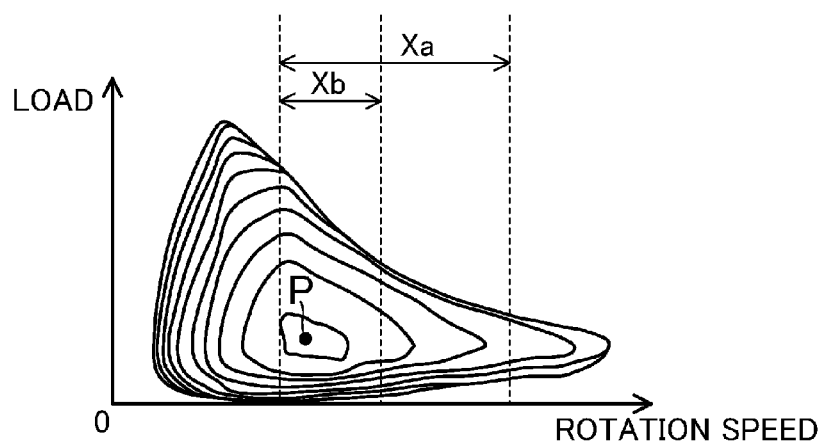

Next, the efficiency of the motor/generator 5 will be described. FIG. 3(B) shows a power generation efficiency map of the motor/generator 5. The solid line in FIG. 3(B) is an equal efficiency curve which connects points of equal power generation efficiency and indicates a borderline between regions.

The maximum efficiency of power generation of the motor/generator 5 according to the present embodiment is 95%. A maximum point P of the power generation efficiency is located in a position where the load is relatively low. The power generation efficiency of the motor/generator 5 reaches a peak at the maximum point P of power generation efficiency, and decreases as the rotation speed is reduced or increased, or the load is reduced or increased. More specifically, the power generation efficiency of the motor/generator 5 drastically decreases when the rotation speed is reduced as compared when the rotation speed is increased.

Here, the rotation speed at the maximum point P of power generation efficiency of the motor/generator 5 (i.e., the rotation speed at which the power generation efficiency is maximum) is included in a rotation speed range Xa corresponding to a lower-speed part a of the 95% fuel-consumption efficiency operating range A of the engine 1 (i.e., a lower one of two equal parts into which the operating range A is divided in terms of the rotation speed). In the example described above, the rotation speed range Xa corresponding to the lower-speed part a of the 95% fuel-consumption efficiency operating range A of the engine 1 extends from 1000 rpm to 2500 rpm, in which the rotation speed at the maximum point P of power generation efficiency of the motor/generator 5 is included. More preferably, the rotation speed at the maximum point P of power generation efficiency of the motor/generator 5 is within a rotation speed range Xb (1000-1600 rpm in the example described above) corresponding to a 20% part b of the lower part of the 95% fuel-consumption efficiency operating range A of the engine 1. Alternatively, the rotation speed at the maximum point P of power generation efficiency of the motor/generator 5 is less than 1/3 of the rated rotation speed of the engine 1.

The controller 4 controls the engine 1 and the motor/generator 5 having the configuration described above in a manner described below.

Specifically, the controller 4 drives the drive wheels 63, 63 only by power of the motor/generator 5 in an operating range in which the load is very low (this operating range is also referred to as a "motor operating range"), and drives the drive wheels 63, 63 by power of at least the engine 1 in an operating range in which the load is higher than the load in the motor operating range (this operating range is also referred to as an "engine operating range").

The motor operating range is an operating range in which the fuel-consumption efficiency of the engine 1 is reduced. The motor operating range is, for example, an operating range in which the load is lower than the load in the 95% fuel-consumption efficiency operating range A. In this operating range, the clutch 61 is released, thereby disconnecting the engine 1 from the motor/generator 5. The motor/generator 5 is operated by electric power from the battery 64 to drive the drive wheels 63, 63. In this way, in the motor operating range, the hybrid vehicle 100 runs by only power from the motor/generator 5.

The engine operating range is an operating range in which the load is higher than the load in the motor operating range. This operating range includes a first operating range in which electricity is generated by part of power from the engine 1 while the vehicle is driven by the rest of the power, and a second operating range in which all of the power from the engine 1 is used to drive the vehicle.

Specifically, the first operating range is an operating range in which a torque required by the vehicle is lower than a load allowing the engine 1 to be operated at preferable fuel-consumption efficiency. In the first operating range, a surplus torque is added to the torque required by the vehicle, thereby increasing the torque required by the vehicle to the load allowing the engine 1 to be operated at preferable fuel-consumption efficiency, and in this state, the engine 1 is operated. The surplus torque of the output torque output in this way is used to operate the motor/generator 5, and the torque required by the vehicle, which is the rest of the output torque, is used to drive the drive wheels 63, 63. That is, in the first operating range, the hybrid vehicle 100 generates electric power by part of the output torque of the engine 1, while the hybrid vehicle 100 runs by using the remaining torque.

For example, the first operating range is an operating range in which the load is lower than the load in the 95% fuel-consumption efficiency operating range A and higher than the load in the motor operating range. That is, the motor operating range and the first operating range of the engine operating range are located in a position where the load is lower than the load in the 95% fuel-consumption efficiency operating range A. In the first operating range, the torque required by the vehicle does not reach the load of the 95% fuel-consumption efficiency operating range A. Therefore, a surplus torque is added to the torque required by the vehicle, so that the output torque reaches the load of the 95% fuel-consumption efficiency operating range A, and in this state, the engine 1 is operated. That is, the torque required by the vehicle corresponds to the first operating range, but in practice, the engine 1 is operated in an operating state in the 95% fuel-consumption efficiency operating range A.

The second operating range is an operating range in which the load is higher than the load in the first operating range, wherein the second operating range includes an operating range in which the engine 1 can be operated at preferable fuel-consumption efficiency and an operating range in which the load is higher than the load in the operating range in which the engine 1 can be operated at preferable fuel-consumption efficiency. In the second operating range, the engine 1 is operated at a load according to the torque required by the vehicle. All of the output torque of the engine 1 is used to drive the drive wheels 63, 63. In this case, generally, the motor/generator 5 neither outputs power nor generates electricity. That is, the hybrid vehicle 100 runs by using power only from the engine 1. Here, when the output torque only from the engine 1 is insufficient, the motor/generator 5 is operated by the electric power of the battery 64, and the power of the engine 1 and the power of the motor/generator 5 are used to drive the drive wheels 63, 63. Moreover, even when the output torque only from the engine 1 is sufficient, if the charged amount of the battery 64 is insufficient, the engine 1 is operated in a state in which a torque obtained by adding the surplus torque to the torque required by the vehicle is output. The surplus torque is used to generate electricity, that is, to operate the motor/generator 5, and the torque required by the vehicle, which is the remaining torque, is used to drive the drive wheels 63, 63.

As described above, the hybrid vehicle 100 according to the present embodiment has an operating range in which the engine 1 and the motor/generator 5 are both operated. In the hybrid vehicle 100, the motor/generator 5 is connected between the engine 1 and the transmission 62 in series. Therefore, the motor/generator 5 rotates at the same rotation speed as the engine 1 when the engine 1 and the motor/generator 5 are both operated. Here, as described above, the rotation speed at the maximum point P of power generation efficiency of the motor/generator 5 is included in the rotation speed range corresponding to the 95% fuel-consumption efficiency operating range A of the engine 1. Therefore, when the engine 1 is operated in a high-efficiency operating range, the motor/generator 5 is necessarily operated at a rotation speed in which the power generation efficiency is high. In contrast, even when priority is assigned to the power generation efficiency of the motor/generator 5 to operate the engine 1 at a rotation speed in which the power generation efficiency of the motor/generator 5 is high, this necessarily means that the engine 1 is operated in the high-efficiency operating range.

Figure 4:
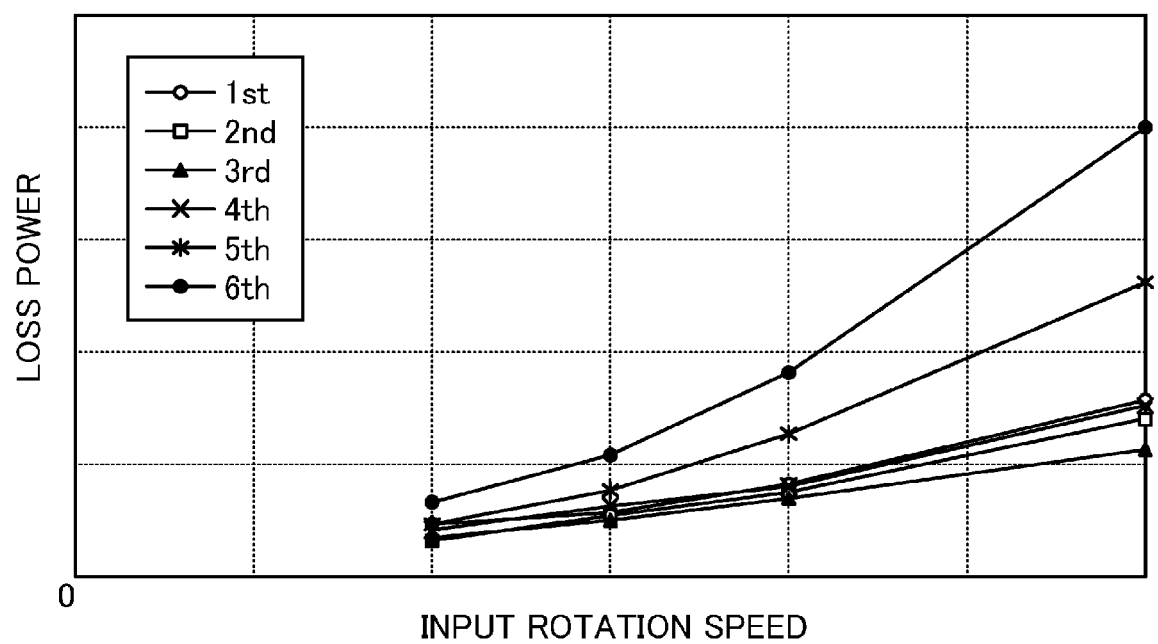
FIG. 4 is a graph illustrating the relationship of the transmission to the input revolution.

Here, the rotation speed at the maximum point P of power generation efficiency of the motor/generator 5 is included in the rotation speed range corresponding to the lower-speed part a of the high-efficiency operating range A of the engine 1. Therefore, when the engine 1 and the motor/generator 5 are operated at a rotation speed in which both the efficiency of the engine 1 and the power generation efficiency of the motor/generator 5 are high, the resistance of the transmission 62 can also be reduced. That is, the loss power of the transmission 62 increases as the input rotation speed increases. FIG. 4 illustrates the relationship of the loss power to the input rotation speed of the transmission. In FIG. 4, the relationship of the loss power to the input rotation speed of the transmission is shown for each of transmission gear positions. The agitation resistance and drag resistance of the transmission 62 increase as the rotation speed increases, and thus the loss power of the transmission 62 increases. That is, when the maximum point P of power generation efficiency of the motor/generator 5 is matched to the high-efficiency operating range A of the engine 1 at a rotation speed as low as possible, the resistance of the transmission 62 can also be reduced in operating the engine 1 and the motor/generator 5 at high efficiency. In this way, the engine 1, the motor/generator 5, and the transmission 62 can be simultaneously operated at high efficiency.

When the power required by the vehicle increases while the engine 1 is operated in an operation state which is in the second operating range and in the lower-speed part a of the 95% fuel-consumption efficiency operating range A, the operation state of the engine 1 is changed in the lower-speed part a of the 95% fuel-consumption efficiency operating range A. That is, even when the output of the engine 1 is increased, high fuel-consumption efficiency can be maintained as long as the operation state is controlled within the 95% fuel-consumption efficiency operating range A. However, when the output of the engine 1 is increased by increasing the rotation speed, the resistance of the transmission 62 increases as the rotation speed increases. To solve the problem, when the output of the engine 1 is increased, the torque, rather than the rotation speed, is increased, thereby maintaining the rotation speed as low as possible. In this way, the output of the engine 1 can be increased while the resistance of the transmission 62 is controlled. Preferably, the operation state of the engine 1 is changed in the 20% part b of the lower part of the 95% fuel-consumption efficiency operating range A to increase the output. More specifically, the torque of the engine 1 is increased along the borderline on a lower-speed side of the lower-speed part a, thereby increasing the output of the engine 1.

Thus, according to the present embodiment, the specifications of the engine 1 and the motor/generator 5 are set such that the rotation speed at the maximum point P of power generation efficiency of the motor/generator 5 is included in the rotation speed range Xa corresponding to the lower-speed part a of the 95% fuel-consumption efficiency operating range A of the engine 1. In this way, it is possible to improve the efficiency of the entire system of the hybrid vehicle 100.

That is, in the hybrid vehicle 100 according to the present embodiment, the motor/generator 5 is connected between the engine 1 and the transmission 62. Therefore, when part of the power of the engine 1 is used to operate the motor/generator 5 to generate electricity, and simultaneously, the remaining power is used to drive the drive wheels 63, 63, the motor/generator 5 rotates at the same rotation speed as the engine 1. Here, when the rotation speed in the operating range in which the power generation efficiency of the motor/generator 5 is high overlaps the rotation speed in the 95% fuel-consumption efficiency operating range A of the engine, the motor/generator 5 can be operated at a rotation speed in which the power generation efficiency is high while the engine 1 is operated in the 95% fuel-consumption efficiency operating range A.

However, an operating range in which the fuel-consumption efficiency of a conventional engine is high is located on a position where the load is relatively high and the speed is relatively high. In contrast, in the engine 1 of the present embodiment, the operating range in which the fuel-consumption efficiency is high, for example, the 95% fuel-consumption efficiency operating range A is extended to a lower load and a lower speed as described above by providing the heat-insulating barrier 3 to the engine 1, setting the geometrical compression ratio of the engine 1 to 13 or greater, setting the effective expansion ratio to be higher than the effective compression ratio of the engine 1 in the partial-load operating range, allowing the engine 1 to perform the compression self-ignition, etc. As a result, when the rotation speed in an operating range in which the power generation efficiency of the motor/generator 5 is high is set within the rotation speed range corresponding to the 95% fuel-consumption efficiency operating range A of the engine 1, the degree of freedom in the setting is increased.

Therefore, the specifications of the engine 1 and the motor/generator 5 are set such that the rotation speed at the maximum point P of power generation efficiency of the motor/generator 5 is included in the rotation speed range Xa corresponding to the lower-speed part a of the 95% fuel-consumption efficiency operating range A of the engine 1. In this way, it is possible to reduce the rotation speed when the engine 1 and the motor/generator 5 are operated at high efficiency. Reducing the rotation speed can reduce the resistance of the transmission 62. As a result, it is possible to improve the efficiency of the entire system of the hybrid vehicle 100.

Moreover, as illustrated in FIG. 3(B), the operating range in which the power generation efficiency of the motor/generator 5 is high extends from the maximum point P of power generation efficiency to a higher rotation speed rather than a lower rotation speed. Therefore, when the rotation speed at the maximum point P of power generation efficiency of the motor/generator 5 is included in the rotation speed range Xa corresponding to the lower-speed part a of the 95% fuel-consumption efficiency operating range A of the engine 1, not only the rotation speed at the maximum point P of power generation efficiency but also the rotation speed range corresponding to the operating range in which the power generation efficiency of the motor/generator 5 is high overlaps the rotation speed range corresponding to the 95% fuel-consumption efficiency operating range A of the engine 1. That is, the rotation speed range corresponding to the 95% fuel-consumption efficiency operating range A of the engine 1 can entirely overlap the rotation speed range corresponding to the operating range in which the power generation efficiency of the motor/generator 5 is high.

Moreover, when the vehicle runs while generating electricity by the motor/generator 5, the motor/generator 5 can be operated at a rotation speed in which the power generation efficiency is high. Therefore, it is possible to increase the amount of generated electricity. Therefore, it is possible to extend the motor operating range to a higher load. Alternatively, since the amount of generated electricity can be sufficiently ensured, the motor/generator 5 can be downsized instead of extending the motor operating range to a higher load.

Moreover, when the power required by the vehicle is increased in the operating range in which the vehicle runs while using part of the power of the engine 1 to operate the motor/generator 5 to generate electricity, the output of the engine 1 is increased in the lower-speed part a of the 95% fuel-consumption efficiency operating range A, so that the output of the engine 1 can be increased while the resistance of the transmission 62 is reduced as much as possible.

Moreover, the engine 1 is controlled such that the geometrical compression ratio is greater than or equal to 13 and that at least in a partial-load operating range, the ratio of the effective expansion ratio to the effective compression ratio is higher in a lower-load operating range than in a higher-load operating range. Moreover, the engine 1 is provided with the heat-insulating barrier 3, has an excess air ratio $\lambda$ greater than or equal to 2 and less than or equal to 8, or a G/F greater than or equal to 30 and less than or equal to 120 in at least the partial-load operating range, and allows combustion by compression self-ignition. Therefore, the operating range in which the fuel-consumption efficiency of the engine 1 is high, for example, the 95% fuel-consumption efficiency operating range A can be extended to a lower load and a lower speed. As a result, the rotation speed at the maximum point P of power generation efficiency of the motor/generator 5 can be set to a value as low as possible. Thus, the resistance of the transmission 62 in operating the engine 1 and the motor/generator 5 can be reduced as much as possible.

Note that the engine 1 is provided with the heat-insulating barrier 3, has a geometrical compression ratio set to 13 or greater, has an effective expansion ratio higher than the effective compression ratio in at least the partial-load region, has an excess air ratio λ greater than or equal to 2 and less than or equal to 8, or a G/F greater than or equal to 30 and less than or equal to 120 in at least the partial-load operating range, and allows combustion by the compression self-ignition. However, the engine is not limited to this embodiment, and any engine may be used.

Moreover, in the embodiment, the specifications of the engine 1 and the motor/generator 5 are set such that the rotation speed at the maximum point P of power generation efficiency of the motor/generator 5 is included in the rotation speed range Xa corresponding to the lower-speed part a of the 95% fuel-consumption efficiency operating range A of the engine 1. However, the specifications of the engine 1 and the motor/generator 5 may be set such that the rotation speed of the motor/generator 5 at the maximum drive efficiency point (point at which the drive efficiency of the motor/generator 5 serving as a motor/generator 5 is maximum), but not the power generation efficiency, is included in the rotation speed range Xa corresponding to the lower-speed part a of the 95% fuel-consumption efficiency operating range A of the engine 1, preferably included in the rotation speed range Xb corresponding to the 20% part b of the lower part. In this way, when the vehicle runs by the power of the engine 1 and the power of the motor/generator 5, the efficiency of the entire system of the hybrid vehicle 100 can be improved. That is, at the same time when the engine 1 is operated, the motor/generator 5 is operated by the electric power from the battery 64. Therefore, when the rotation speed in the operating range in which the drive efficiency of the motor/generator 5 is high overlaps the rotation speed in the 95% fuel-consumption efficiency operating range A of the engine, it is possible to operate the motor/generator 5 as a motor at high efficiency while operating the engine 1 at high efficiency. Moreover, the resistance of the transmission 62 in the above operation can be reduced. Note that both the rotation speed of the motor/generator 5 at a maximum power generation efficiency and the rotation speed of the maximum drive efficiency are preferably included in the rotation speed range corresponding to the lower-speed part a of the 95% fuel-consumption efficiency operating range A of the engine 1. With this configuration, both in the case where the motor/generator 5 functions as a generator and in the case where the motor/generator 5 functions as a motor, the efficiency of the entire system of the hybrid vehicle 100 can be improved.

Note that the foregoing embodiments have been set forth merely for purposes of preferred examples in nature, and are not intended to limit the scope, applications, and use of the invention.

INDUSTRIAL APPLICABILITY

As described above, the present invention is useful for parallel hybrid vehicles including a motor/generator provided between an engine and a transmission.

DESCRIPTION OF REFERENCE CHARACTERS

100 Hybrid Vehicle
1 Engine
5 Motor/Generator
62 Transmission

The invention claimed is:

1. A method for operating an engine and a motor/generator of a parallel hybrid vehicle in which the motor/generator is provided between the engine and a transmission, the method comprising:
   determining a fuel consumption efficiency of the engine and establishing an operating range of the engine in which a ratio of fuel-consumption efficiency of the engine to maximum fuel-consumption efficiency of the engine is higher than or equal to 95%,
   setting a lower-speed part that is less than 2500 rpm within the operating range of the engine in which the ratio of fuel-consumption efficiency of the engine to maximum fuel-consumption efficiency of the engine is higher than or equal to 95%; and
   controlling operation of the engine and the motor/generator with a controller such that a rotation speed at a maximum point of power generation efficiency of the motor/generator is within a rotation speed range corresponding to the lower-speed part of the operating range in which a ratio of fuel-consumption efficiency of the engine to maximum fuel-consumption efficiency of the engine is higher than or equal to 95%.

2. The method of claim 1, wherein
   a geometrical compression ratio of the engine is greater than or equal to 13, and
   in a lean operation, the engine operates with an excess air ratio set to 2-8 or a G/F set to 30-120, and allows combustion by compression self-ignition.

3. The method of claim 1, wherein
   a geometrical compression ratio of the engine is greater than or equal to 13, and
   a ratio of an effective expansion ratio to an effective compression ratio of the engine is higher in an operating range in which an engine load is lower than an engine load when the engine is in the operating range in which the ratio of fuel-consumption efficiency to of the engine to maximum fuel-consumption efficiency of the engine is higher than or equal to 95%.

4. A parallel hybrid vehicle comprising:
   an engine;
   a transmission; and
   a motor/generator provided between the engine and the transmission, wherein
   a rotation speed at a maximum point of power generation efficiency of the motor/generator is within a rotation speed range corresponding to a lower-speed part of an operating range in which a ratio of fuel-consumption efficiency of the engine to maximum fuel-consumption efficiency is higher than or equal to a predetermined ratio, the lower-speed part determined from minimum and maximum rotation speeds of the engine in the operating range of the engine in which the ratio of fuel-consumption efficiency of the engine to maximum fuel-consumption efficiency is higher than or equal to the predetermined ratio and setting the lower-speed part to be the part bounded by an engine rotation speed that is halfway between the maximum and the minimum rotation speeds; and the engine is configured to perform a lean operation in an operating range where a load is lower than a load in the operating range of the engine in which the ratio of fuel-consumption efficiency of the engine to maximum fuel-consumption efficiency is higher than or equal to the predetermined ratio by operating at an excess air ratio in a range of 2-8 or a gas fuel ratio in a range of 30-120, and is kept operated in the lower-speed part of the operating range when an output of the engine is increased in a state in which the engine is operated in the lower-speed part of the operating range.

5. The hybrid vehicle of claim 4, wherein
the predetermined ratio is 95%.

6. The hybrid vehicle of claim 4, wherein
a geometrical compression ratio of the engine is greater than or equal to 13, and in the lean operation allows combustion by compression self-ignition.

7. The hybrid vehicle of claim 4, wherein
a geometrical compression ratio of the engine is greater than or equal to 13, and a ratio of an effective expansion ratio to an effective compression ratio of the engine is higher in the operating range where the load is lower than the load in the operating range of the engine where the ratio of fuel-consumption efficiency of the engine to maximum fuel-consumption efficiency is higher than or equal to the predetermined ratio.

* * * * *